United States Patent [19]

Krüger

[11] Patent Number: 4,667,853
[45] Date of Patent: May 26, 1987

[54] DEVICE FOR THE METERED DELIVERY OF LIQUIDS

[75] Inventor: Manfred Krüger, Berlin, Fed. Rep. of Germany

[73] Assignees: Bosch Siemens Hausergerate GmbH, Stuttgart, Fed. Rep. of Germany; The Coca Cola Company, Atlanta, Ga.

[21] Appl. No.: 711,364

[22] Filed: Mar. 13, 1985

[30] Foreign Application Priority Data

Mar. 13, 1984 [DE] Fed. Rep. of Germany ....... 3409142

[51] Int. Cl.$^4$ .......................... B67B 7/24; B65D 5/72
[52] U.S. Cl. ...................................... 222/80; 222/87; 222/541; 222/545; 222/568
[58] Field of Search ...................... 222/81, 82, 83, 87, 222/89, 568, 129.3, 476, 541, 542, 80, 545, 147; 220/266, 278, 89 A, 86 NR

[56] References Cited

U.S. PATENT DOCUMENTS

| 3,258,166 | 6/1966 | Kuckens | 222/504 X |
| 3,613,955 | 10/1971 | Wetherell, Jr. | 222/87 X |
| 3,844,454 | 10/1974 | Buchtel | 222/476 X |
| 4,109,829 | 8/1978 | Kuckens et al. | 222/81 |
| 4,214,675 | 7/1980 | Schmit | 222/83 |
| 4,496,078 | 1/1985 | Nelzow et al. | 222/89 X |

Primary Examiner—H. Grant Skaggs
Assistant Examiner—Gregory L. Huson
Attorney, Agent, or Firm—Birch, Stewart, Kolasch & Birch

[57] ABSTRACT

A system for the metered delivery of liquids from a storage vessel having a metering valve releasably attached to an outlet of the storage vessel which, upon being mounted on the outlet, renders unfit for further use a part which is integrated into this outlet and is necessary for the proper operation of the metering valve.

10 Claims, 9 Drawing Figures

DEVICE FOR THE METERED DELIVERY OF LIQUIDS

BACKGROUND OF THE INVENTION

The invention relates to a system for the metered delivery of liquids from a storage vessel by means of a metering valve releasably attached to the outlet of the storage vessel. The metering valve includes a control ram that alternately closes and opens the inlets and outlets of the metering valve. A functional area element with inlets to the metering valve attached to the storage vessel. Only when the main part of the metering valve is secured for the first and only time on the storage vessel, does it form a function-oriented metering unit therewith. After removal of the metering valve, the storage vessel cannot be reused.

A number of techniques are known for the metered delivery of aliquots of a liquid from a relatively large quantity of liquid stored in a storage vessel. Different appropriately-dimensioned metering units are employed, depending on the properties of the liquids. The metering units can either be an integral part of the storage vessel or they can be secured thereon.

As a rule, the prior art vessels of the above mentioned type can be reused without any problems. After all, or only part, of the contents of a prior art vessel has been used, the metering unit attached to a discharge opening of the vessel can be removed therefrom, for example, by unscrewing a screw cap, so that the vessel can be refilled. For a number of applications, this facility can create problems. This option of refilling a storage vessel can be problematical, especially if special requirements are imposed on the properties and/or qualities of the liquid to be dispensed. As an example, these requirements are made in connection with equipment intended to provide, in individual portions, beverages prepared from a primary liquid and a beverage concentrate. The beverage vendor aims at ensuring that beverages with a constant quality are available to the consumer. If these beverages are offered in previously prepared bottles, the options for quality control by the manufacturer and by the vendor are far-reaching. But if the ultimate beverage production occurs outside the direct area of influence of the beverage manufacturer or of the vendor because a primary liquid must be mixed with a beverage concentrate, then care must be exercised that this mixture have the generally recognized and desired standard of quality. Essential quality criteria are defined in the mixing mode, the mixing ratio and, in particular, the properties of the beverage concentrate. Therefore, the unambiguous allocation of the beverage concentrate to a metering unit is of particular significance.

For function-oriented reasons, it is advisable to dispose the metering valve unit in the beverage dispenser through which the beverage mixture is provided. In this connection, this metering unit can also be removed from the apparatus in order to be attached to the outlet of a storage vessel. Metering valves are known (West German Laid-open Application Nos. 25 44 671 and 30 33 874) in which a ram with an inlet and outlet are employed, wherein the ram, whose lift position can be varied by an electromagnet, is designed as a metering chamber and alternately closes and opens the inlet or outlet. Now, it is desirable to take steps to secure the metering valve without ambiguity to a type of storage vessel and, thereby, to a specific beverage concentrate. A high degree of quality assurance in maintaining the appropriate amount of a particular concentrate is attained by disposing, from a constructional engineering standpoint, a functional part of the metering valve to the outlet of the storage vessel. Thus, it is common practice to dispose an element with inlets for the metering valve to the outlet of the storage vessel. The metering valve is inoperable without this element. Only if the metering valve is used in conjunction with an appropriately equipped storage vessel having an inlet element will the metering valve be operable. Now, in order to prevent, to the largest extent possible, the improper reuse of concentrate vessels with beverage concentrates whose quality can possibly lead to an unsatisfactory resulting beverage, it is also known to destroy the element with inlets located on the outlet of the storage vessel required for the dispensing operation when removing the metering valve. This step offers a high degree of quality assurance for the function-oriented use of storage vessels in beverage dispensers that are filled with prescribed concentrates. The risk that quality assurance precautions will be tampered with still exists, however.

The object of the present invention is to provide a system for the metered delivery of liquids from a storage vessel using a metering valve of the type described above, by means of which any improper use of the storage vessel for refilled beverage concentrates is prevented to a considerable degree.

Another object of the present invention is to have a metering valve with a functional area element disposed in the storage vessel outlet in order to satisfy the requirements set out in the above problem definition, in which the functional area element with inlets is connected to a mounting flange by connecting webs. The connecting webs are formed with preset breaking points that are destroyed when the main part of the metering valve abuts in function-oriented fashion on the mounting flange in the work position required for operation.

A liquid dispensing device with these features in mind offers excellent preconditions for making extremely difficult the reuse of storage vessels, because the system is so designed that, at the time of the proper application of the metering valve to the outlet of the storage vessel, the preset breaking points of the connecting webs are destroyed. However, the metering valve engages with the functional area element holding it in its operational position. When the metering valve is removed from the discharge opening of the storage vessel, this functional area element with inlets drops automatically off the metering valve into the storage vessel. Reuse is impossible, because the webs that have been destroyed at preset breaking points and are no longer able to cause the functional area element with inlets to mesh with the metering valve to be inserted.

According to a preferred embodiment of the present invention, the device the system is characterized in that the functional area element with metering valve inlets can be engaged with the main part of the metering valve by means of detachable connecting members. The connecting webs between the functional area element and mounting flange are formed with preset breaking points that are destroyed upon application of a starting torque required for the function-oriented abutment of the main part of the metering valve on the bearing face of the mounting flange. The distance between bearing faces of the functional area element and attached flange portion valve is smaller than the distance of the corresponding bearing faces of the main part of the metering valve. Thus, when the metering valve is inserted into the storage vessel outlet, a connection is obtained between said main part of the metering valve and the functional area element with metering valve inlets by use of the connecting webs formed as preset breaking points. Not until the metering valve is inserted further into the outlet of the storage vessel will the metering valve manage to abut in function-oriented fashion on the mounting flange. During this process, the connecting webs between the functional area element with metering valve inlets and the mounting flange are overextended and destroyed. Reuse is ruled out. When the main part of the metering valve is removed from the outlet of the storage vessel, the elastically-arrested, functional area element is stripped off the main part of the metering valve by the mounting flange and drops into the empty storage vessel.

In this connection, it is preferable that the main part of the metering valve be operatively connected to the mounting flange via a screw joint advancing in the direction functional area of the element with inlets. From the function-oriented point of view, a screw joint is, for this field of application, a suitable connecting member and is able, without further provision, to transmit the necessary forces for the destruction of the preset breaking points. The screw joint element on the side of the metering valve may be an integral part of the main part of the metering valve, or it may also be designed as a union nut.

It is extremely simple to design the connecting members between the main part of the metering valve and the functional area element with valve inlets as snap-stop elements that can be engaged and disengaged elastically.

According to another preferred embodiment, the device is characterized in that the functional area element with metering valve inlets has screw joint elements that engage with the main part of the metering valve. The connecting webs between the functional area element and mounting flange are formed as preset breaking points that are destroyed upon application of a starting torque required for the function-oriented abutment of the main part of the metering valve on the bearing face of the mounting flange. The distance between the screw joint elements of the main part of the metering valve and its bearing faces that engages the mounting flange is smaller than the distance between the screw joint elements of the functional area element and the bearing face of the mounting flange. When the main part of the metering valve is being inserted, it engages in the screw joint elements of the functional area element with metering valve inlets attached to the intermediate webs formed with preset breaking points. To achieve the function-oriented abutment of the main part of the metering valve with the bearing face of the mounting flange, it is necessary to screw the main part of the metering valve firmly up to the functional area element with metering valve inlets via the screw joint elements. In the process, the intermediate webs formed with preset breaking points are demolished. In the function-oriented position, the functional area element is carried directly by the mounting flange. In order to absorb the torques during the further screwing or unscrewing of the metering valve, stops are arranged between the functional area element with metering valve inlets and the mounting flange. Following removal of the main part of the metering valve from the outlet of the storage vessel by screwing it out of the functional area element with metering valve inlets, this functional area element drops into the empty storage vessel and is therefore unfit for further use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
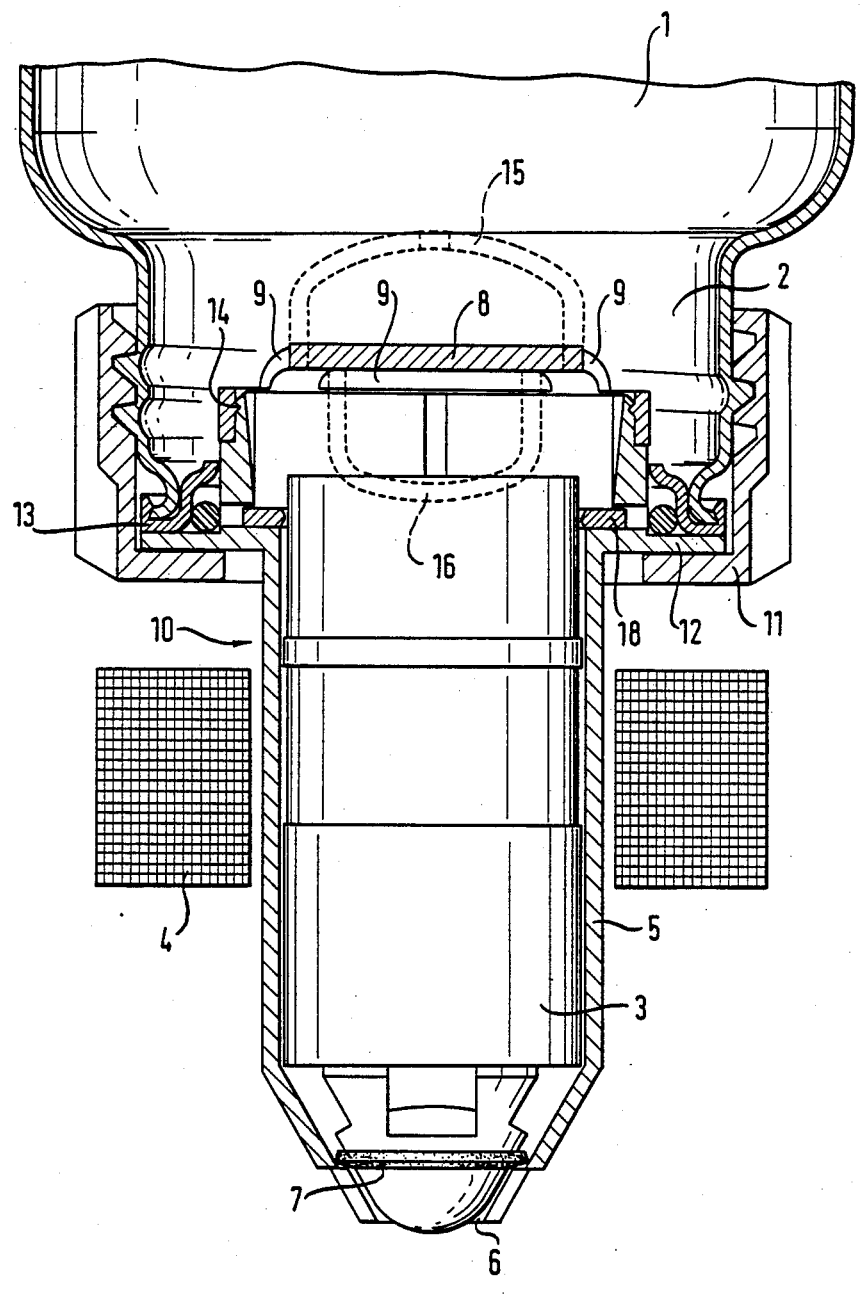
FIG. 1 is a cross-sectional view of a metering unit secured on a storage vessel of the present invention.
Figure 2:
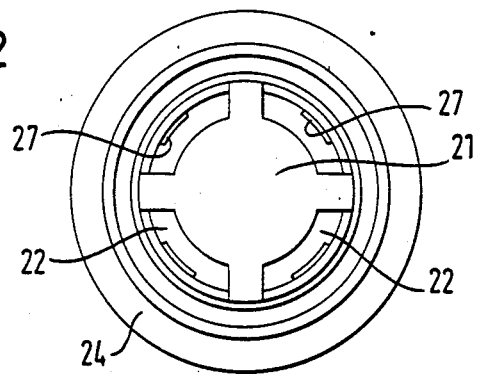
FIGS. 2 to 4 are a top plan view, a side view, and a longitudinal sectional view of a functional area element with metering valve inlets of the present invention.
Figure 3:
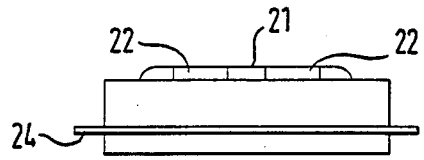
Figure 4:
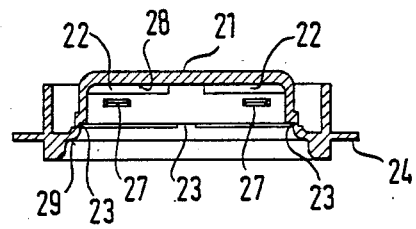
Figure 5:
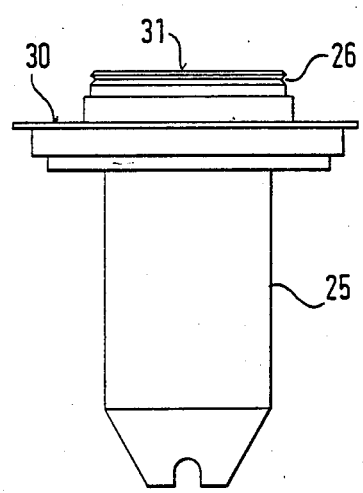
FIG. 5 is a side view of the associated main part of the metering valve of the present invention.
Figure 6:
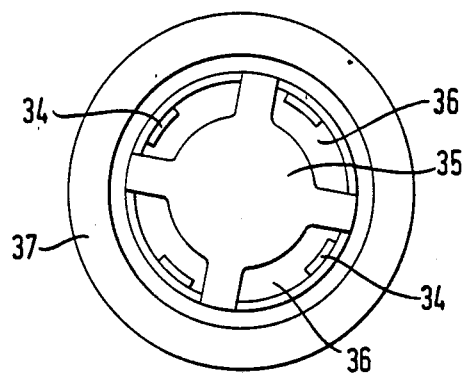
FIGS. 6 to 8 are a top plan view, a side view, and a longitudinal sectional view of another specific embodiment of the functional area element with metering valve inlets.
Figure 7:
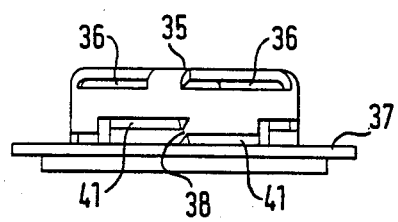
Figure 8:
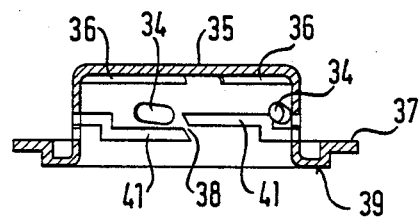
Figure 9:
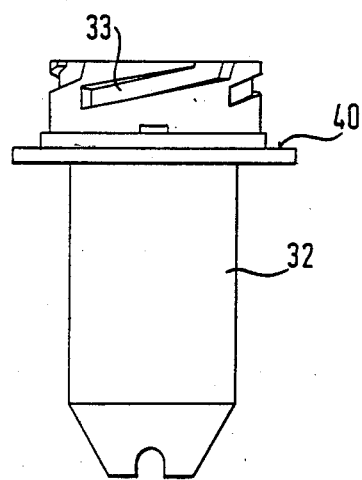
FIG. 9 is a side view of a main part of the metering valve assigned to said functional area element.

FIG. 1 is a simplified illustration of a system for the batchwise delivery of beverage concentrates stored in storage vessel 1. A metering valve is placed on the outlet 2 of this storage vessel 1 and its ram 3 can be adjusted upwards against the force of gravity acting thereon upon energization of an electromagnet 4. The lower part of the ram is made from ferromagnetic material, so that the system acts as a magnetic system with a plunger-type armature.

This ram is mounted in a housing 5 which has in its lower conical area outlets that are closed by a sealing ring 7 in the position shown, i.e., when the electromagnet 4 is de-energized. Above the ram 3 there is provided a functional area element 8 with metering valve inlets 9. The beverage concentrate can be passed from the storage vessel 1 through these metering valve inlets into the metering valve chamber and then to the sealing ring due to the hollow-cylindrical design of the ram 3. When the electromagnet 4 is energized, the ram 3 is raised and thrusted sealingly against the functional area element 8 with metering valve inlets 9. Thus, the flow of beverage concentrate from the storage vessel 1 to the metering valve chamber is interrupted. On the other hand, the sealing ring 7 is now raised from the lower outlet 6 of the metering valve, so that the beverage concentrate in the metering valve chamber is dispensed in portions with a high degree of accuracy due to its gravitational force and can issue downward from the outlet 6. After the metering valve chamber is emptied, the electromagnet 4 is again de-energized and the metering valve chamber is refilled with beverage concentrate through the metering valve inlets 9, which are now open again.

Essential components of the metering valve system are therefore: the ram 3 slidably mounted in the housing 5 and performing the control functions, as well as the inlets 9 and outlets 6 that can alternately be closed and opened by the control ram 3. The metering valve is now divided into a main part 10 that can be removed from the storage vessel and consists of the housing 5 with its outlet 6, the ram 3, and the functional area element 8 with metering valve inlets 9, which is an original component of the storage vessel 1. The main part 10 of the metering valve is connected to the neck of the storage vessel 1 by a screw bushing 11 designed as a union nut via a screw thread and a bearing face 12 of the metering valve housing 5 abuts mounting flange 13.

In the illustrated position, i.e., with the main part 10 of the metering valve properly secured on the storage vessel 1 by means of the screw joint 11, the original functional area element 8 with metering valve inlets 9 connected to the mounting flange 13 via intermediate webs designed with preset breaking points, is separated from mounting flange 13. This separation takes because said functional area element 8 is connected elastically to the housing 5 of the main part 10 of the metering valve by snap-stop elements when the main part 10 of the metering valve is screwed firmly up to the mounting flange 13, the upper edge of the metering valve housing is pressed against the functional area element 8, causing the intermediate webs originally connecting functional area 8 to mounting flange 13 to be destroyed by overextension.

Because of the dome-shaped formations 15, 16 of the functional area element 8 with metering valve inlets 9, the useful metering chamber of the metering valve system can be enlarged or reduced. Therefore, this part assigned to the storage vessel 1 is essentially a decisive factor for the quantity to be measured. Since the properties of the beverage concentrate are essentially, if not exclusively, a decisive factor for determining the quantity to be measured, the direct attachment of this functional part to the storage vessel and, thereby, to the beverage concentrate, is very expedient.

The specific embodiment depicted in FIGS. 2 to 5 corresponds essentially to the system shown in FIG. 1. In this case, it is still evident that the functional area element 21 with metering valve inlets 22 is connected to the mounting flange 24 via webs 23. The metering valve housing 25 can be engaged via a notch 26 with snap-stop elements 27 of the functional area element 21. Since the distance between bearing faces or seat stops 28 and 29 of the functional area element 21 and the mounting flange 24 is selected to be smaller than the distance between bearing faces or seat stops 31, 32 of the metering valve housing 25, the intermediate webs 23 are overextended at the preset breaking points and are destroyed when the metering valve housing 35 contacts functional area element 21. When removing the metering-valve housing 25, the functional area element 21 is stripped off the latter by the mounting flange 24 as the metering valve housing is moved in a direction opposite to the interlocking by the snap-stop elements 26 and 27. The functional area element 21 drops back into the vessel.

In the specific embodiment depicted in FIGS. 6 to 9, the metering valve housing 32 is caused to mesh with screwed shoulders 34 of the functional area element 35 with metering valve inlets 36. Between the functional area element 35 and its mounting flange 37, there is provided interspaces 41 that they are bridged by connecting webs 38. When the metering valve housing 32 is screwed via the threaded members 33 and 34 into the functional area element 35, the bearing faces 39 of the mounting flange 37 and the bearing face 40 of the metering valve housing 32 are supported against one another, so that a concentration of force is applied to the webs 38 between the functional area element 35 and the mounting flange 37, which destroys these webs 38. In the process, the interspaces 41 between the functional area element 35 and the mounting flange 37 are collapsed and the functional area element 35 is carried directly by the mounting flange 37. When the metering valve housing 32 is unscrewed from the functional area element 35, the functional area element 35 falls back into the storage vessel, making another screw joint impossible.

When the metering valve housing 5 has been removed from the storage vessel 1, it is open at the top. The ram 3 is prevented by a retaining ring 18 from dropping out of the metering valve housing 5 in this condition.

I claim:

1. A non-reusable container dispensing system wherein contents of a non-reusable container can be dispensed in controlled volumes comprising:
    a dispensing nozzle with valve means for controlling and delivering a predetermined quantity of the contents of a container;
    a container with an outlet to which said dispensing nozzle can be releasably attached;
    a metering element disposed within the container outlet;
    mounting means substantially permanently attached to said outlet of said container;
    web means for releasably connecting said metering element to said mounting means, said web means including preset breaking points and defining passage means through which the container contents can pass to said nozzle;
    connecting means for releasably coupling said metering element to said dispensing nozzle upon connecting said dispensing nozzle to said container,
    said breaking points of said web means being broken, detaching said metering element from said mounting means, upon said connecting means being releasably coupled to said metering element when connecting said dispensing nozzle to said container,
    said metering element being released from said connecting means of said dispensing nozzle and substantially retained within said container upon removing said dispensing nozzle from said container, thereby preventing the reuse of the container as a controlled volume dispensing device.

2. The non-reusable container dispensing system according to claim 1, in which said metering element includes at least one snap-stop element,
    said connecting means of said dispensing nozzle means including at least one notch for releasably receiving said at least one snap-stop element of said metering element for releasably attaching said dispensing nozzle to said metering element, whereby said at least one snap-stop element of said metering element is displaced from said notch of said connecting means upon removal of said dispensing nozzle from said container due to said mounting means acting on said metering element and prying it from said connecting means of said dispensing nozzle upon removal of said dispensing nozzle from said container.

3. The non-reusable container dispensing system according to claim 2, wherein said mounting means is a substantially circular ring-shaped flange of a predetermined diameter having a seat-stop on which said dispensing nozzle engages upon connecting said dispensing nozzle to said container, said metering element being a substantially circular article of at least the same diameter as said predetermined diameter of said mounting flange, said mounting flange preventing the removal of said metering element and acting as a prying means for removal of said metering element from said connecting means of said dispensing nozzle upon removal of said dispensing nozzle from said container, said mounting flange preventing the removal of said metering element from said container due to said metering element being at least the diameter of said mounting flange after the removal of said dispensing nozzle from said container, said dispensing nozzle including a seat-stop that engages with said seat-stop of said mounting flange upon connecting the dispensing nozzle to the container, said connecting means including a seat-stop engaging a seat-stop of said metering element upon connecting the dispensing nozzle to the container, a distance between said seat-stop of said metering element and the seat-stop of said mounting flange being smaller than the distance between said seat-stop of said dispensing nozzle and said seat-stop of said connecting means of said dispensing nozzle, whereby said seat-stop of said connecting means of said dispensing nozzle engages said seat-stop of said metering element before the engagement of said seat-stop of said dispensing nozzle with said seat-stop of said mounting flange to ensure adequate force exerted solely on said web means including said breaking points to substantially easily break said breaking points upon connecting said dispensing nozzle to said container.

4. The non-reusable container dispensing system according to claim 2, wherein said metering element includes at least one screw shoulder, said connecting means including a threaded member for releasably receiving said at least one screw shoulder of said metering element for releasably attaching said dispensing nozzle to said metering element, whereby said at least one screw shoulder of said metering element is displaced from said threaded member of said connecting means upon removal of said dispensing nozzle from said container due to said mounting means acting on said metering element to allow said connecting means of said dispensing nozzle to be unscrewed from said at least one screw shoulder of said metering element.

5. The non-reusable container dispensing system according to claim 4, wherein said mounting means is a substantially circular ring-shaped flange of a predetermined diameter having a seat-stop on which said dispensing nozzle engages upon connecting said dispensing nozzle to said container, said metering element being essentially a circular article of at least the same diameter as said predetermined diameter of said mounting flange, said metering element and said mounting flange defining a one piece unit connected by said web means, said metering element and said mounting flange having corresponding step portions in which a step portion of the metering element is positioned adjacent a space between adjacent step portions of said mounting flange, said web means maintaining a predetermined spaced relationship between said metering member and said mounting flange, said metering member being forced into engagement with said mounting flange, destroying said preset breaking point, upon said threaded element of said connecting means engaging said at least one shoulder element upon connecting said dispensing nozzle to said container, said step portions of said metering element and said mounting flange engaging upon unscrewing said dispensing nozzle from said container to allow unscrewing said metering element from said connecting means of said dispensing nozzle preventing the removal of said metering element from said container, said threaded portion of said connecting means having a sufficient length so that a seat-stop of said dispensing nozzle engages with said mounting flange followed by said threaded portion then soley exerting a force due to threading upon said web means including said breaking points to substantially easily destroy said breaking points by further screwing of said threaded portion of said connecting means into said metering element.

6. In a system for the metered delivery of liquids from a storage container by means of a metering valve releasably attached to an outlet of the storage container having a control ram that alternatively closes and opens inlets and outlets of the valve wherein a metering element is attached to the storage vessel and only when the main part of the metering valve is secured for the first time and only time onto the storage container does the metering valve form a functioning metering unit, the improvement comprising:

a dispensing nozzle with valve means for controlling and delivering a predetermined quantity of the liquid from the container, said nozzle being releasably attachable to the container;

a metering element disposed within an outlet of the storage container;

mounting means substantially permanently attached to said outlet of said container;

web means for releasably connecting said metering element to said mounting means, said web means including preset breaking points and defining passage means through which the container contents can pass to said nozzle;

connecting means for releasably coupling said metering element to said dispensing nozzle upon connecting said dispensing nozzle to said container, said breaking points of said web means being destroyed, detaching said metering element from said mounting means, upon said connecting means being releasably coupled to said metering element when connecting said dispensing nozzle to said container, said metering element being released from said connecting means of said dispensing nozzle and substantially retained within said container upon removing said dispensing nozzle from said container preventing the reattachment of a dispensing nozzle to said container and ultimately preventing the improper reuse and refilling of the container.

7. The system according to claim 6, in which said metering element includes at least one snap-stop element, said connecting means including at least one notch for releasably receiving said at least one snap-stop element of said metering element for releasably attaching said dispensing nozzle to said metering element, whereby said at least one snap-stop element of said metering element is displaced from said notch of said connecting means upon removal of said dispensing nozzle from said container due to said mounting means acting on said metering element and prying it from said connecting means of said dispensing nozzle upon removal of said dispensing nozzle from said container.

8. The system according to claim 7, wherein said mounting means is a substantially circular ring-shaped flange of a predetermined diameter having a seat-stop on which said dispensing nozzle engages upon connecting said dispensing nozzle to said container, said metering element being a substantially circular article of at least the same diameter as said predetermined diameter of said mounting flange, said mounting flange preventing the removal of said metering element and acting as a prying means for removal of said metering element from said connecting means of said dispensing nozzle upon removal of said dispensing nozzle from said container, said mounting flange preventing the removal of said metering element from said container due to said metering element being at least the diameter of said mounting flange after the removal of said dispensing nozzle from said container, said dispensing nozzle including a seat-stop that engages with said seat-stop of said mounting flange upon connecting the dispensing nozzle to the container, said connecting means including a seat-stop engaging a seat-stop of said metering element upon connecting the dispensing nozzle to the container, a distance between said seat-stop of said metering element and the seat-stop of said mounting flange being smaller than the distance between said seat-stop of said dispensing nozzle and said seat-stop of said connecting means of said dispensing nozzle, whereby said seat-stop of said connecting means of said dispensing nozzle engages said seat-stop of said metering element before the engagement of said seat-stop of said dispensing nozzle with said seat-stop of said mounting flange to ensure adequate force exerted solely on said web means including said breaking points to substantially easily break said breaking points upon connecting said dispensing nozzle to said container.

9. The system according to claim 7, wherein said metering element includes at least one screw shoulder, said connecting means including a threaded member for releasably receiving said at least one screw shoulder of said metering element for releasably attaching said dispensing nozzle to said metering element, whereby said at least one screw shoulder of said metering element is displaced from said threaded member of said connecting means upon removal of said dispensing nozzle from said container due to said mounting means acting on said metering element to allow said connecting means of said dispensing nozzle to be unscrewed from said at least one screw shoulder of said meter element.

10. The system according to claim 9, wherein said mounting means is a substantially circular ring-shaped flange of a predetermined diameter having a seat-stop on which said dispensing nozzle engages upon connecting said dispensing nozzle to said container, said metering element being essentially a circular article of at least the same diameter as said predetermined diameter of said mounting flange, said metering element and said mounting flange defining a one piece unit connected by said web means, said metering element and said mounting flange having corresponding step portions in which a step portion of the metering element is positioned adjacent a space between adjacent step portions of said mounting flange, said web means maintaining a predetermined spaced relationship between said metering member and said mounting flange, said metering member being forced into engagement with said mounting flange, destroying said preset breaking point, upon said threaded element of said connecting means engaging said at least one shoulder element upon connecting said dispensing nozzle to said container, said step portions of said metering element and said mounting flange engaging upon unscrewing said dispensing nozzle from said container to allow unscrewing said metering element from said connecting means of said dispensing nozzle preventing the removal of said metering element from said container, said threaded portion of said connecting means having a sufficient length so that a seat-stop of said dispensing nozzle engages with said mounting flange followed by said threaded portion then soley exerting a force due to threading upon said web means including said breaking points to substantially easily destroy said breaking points by further screwing of said threaded portion of said connecting means into said metering element.

* * * * *